June 15, 1954  C. H. INGWER ET AL  2,680,861
DRIVE RELEASE FOR PIPE THREADERS
Filed April 11, 1950  4 Sheets-Sheet 1

INVENTORS
CARL H. INGWER
HUGH BEAVIS
BY
their atty

June 15, 1954  C. H. INGWER ET AL  2,680,861
DRIVE RELEASE FOR PIPE THREADERS
Filed April 11, 1950  4 Sheets-Sheet 2

INVENTORS
CARL H. INGWER
HUGH BEAVIS

June 15, 1954  C. H. INGWER ET AL  2,680,861
DRIVE RELEASE FOR PIPE THREADERS
Filed April 11, 1950  4 Sheets-Sheet 3

INVENTORS
CARL H. INGWER
HUGH BEAVIS

June 15, 1954  C. H. INGWER ET AL  2,680,861
DRIVE RELEASE FOR PIPE THREADERS
Filed April 11, 1950  4 Sheets-Sheet 4

INVENTORS
CARL H. INGWER
HUGH BEAVIS

Patented June 15, 1954

2,680,861

UNITED STATES PATENT OFFICE 2,680,861

DRIVE RELEASE FOR PIPE THREADERS

Carl H. Ingwer and Hugh Beavis, Elyria, Ohio, assignors to The Ridge Tool Company, Elyria, Ohio Application April 11, 1950, Serial No. 155,178

13 Claims. (Cl. 10—120.5)

1

This invention relates to thread cutting machines, and more particularly to a safety device adapted to prevent driving the machine beyond a predetermined point to prevent jamming of the device.

Many types of pipe threaders have been made in the past. Among the successful types is that shown in the patent to William O. Thewes, No. 1,956,182, issued April 24, 1934. This type of machine may be hand driven through a handle, or a pipe may be threaded in such a tool by turning the pipe and holding the threader stationary by means of its driving handle.

Since the device has a series of threads for the purpose of pulling the cutters onto the pipe at the proper speed and pitch and of serving as lead threads to preserve the proper pitch, it is desirable to stop the driving of the machine when the end of the lead threads is nearly reached. If this is not done, the operator of the power drive must turn off the switch at the right moment or the device will become jammed or possibly broken.

By our invention, we provide a means whereby the driving relationship between the driving handle and the cutters is broken at a point near the end of the threads where the thread chasers are released from engagement with the pipe. This is accomplished by releasing a ratchet dog by any of a group of allied mechanisms, each operated by a cam action and each dependent on the relative location of the parts of the threader for its actuation.

A more complete understanding of our invention may be acquired by reference to the following figures and description which form a part of this specification.

In the drawings:

Fig. 10 is a partial elevational view, a part of

Figure 10:
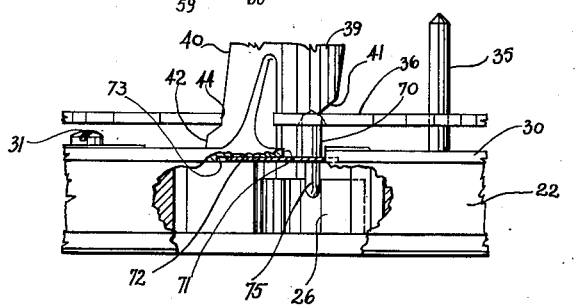
Figure 11:
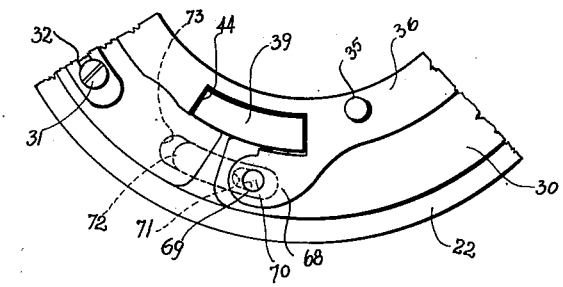
Figure 12:
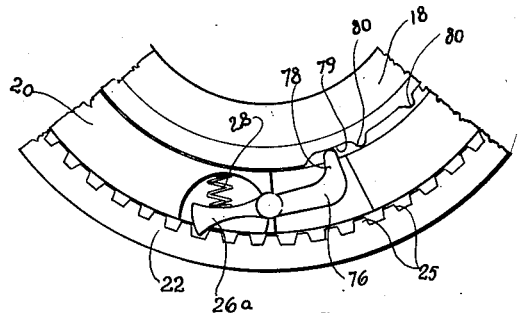
Figure 13:
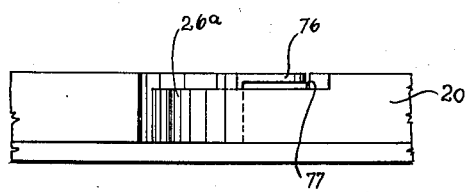

2 the drive ring being broken away to show another embodiment of the invention;

Fig. 11 is a partial plan view of the embodiment of Fig. 10;

Fig. 12 is a partial plan view of still another embodiment of my invention, with the drive plate removed to show underlying parts; and Fig. 13 is a partial elevational view of the device of Fig. 12, the drive ring being removed to show underlying parts.

Briefly, my invention comprises a means for releasing a set of thread cutting chasers from a normal driving relationship with the handle of a threader. This is accomplished by causing a pin to engage a driving dog or pawl of a ratchet mechanism to move the pawl out of engagement with its ratchet teeth.

More specifically, and referring to the drawings, I have illustrated the invention in combination with a pipe threader such as disclosed in the aforesaid patent to William Thewes. It will be recognized that the invention is not limited to such combination, but might be used in any threading die which is driven by a somewhat similar mechanism.

As illustrated, the die includes a work holder 11 which may be of the general type disclosed in Patent No. 1,973,232 issued to William O. Thewes on September 11, 1934. This holder 11 is adapted to be clamped on a length of pipe and to hold the tool in place thereon. The workholder 11 is threaded onto a barrel 12 having a series of lead threads of the same pitch as a standard pipe thread. This barrel 12 is a part of a piece which also includes a ring 20 formed with an annular groove 19 in which a cam plate 18 may be journalled. The thread chasers 14 are slidably mounted in slots 15 in this ring 20 for adjustment to different sizes of pipe and to cut the taper required by standards for pipe thread and are held in place in those slots from beneath by a face plate 13 fixed to the ring 20 by rivets 21 which may preferably be sunk in counterbored holes 29 in the ring.

Figure 1:
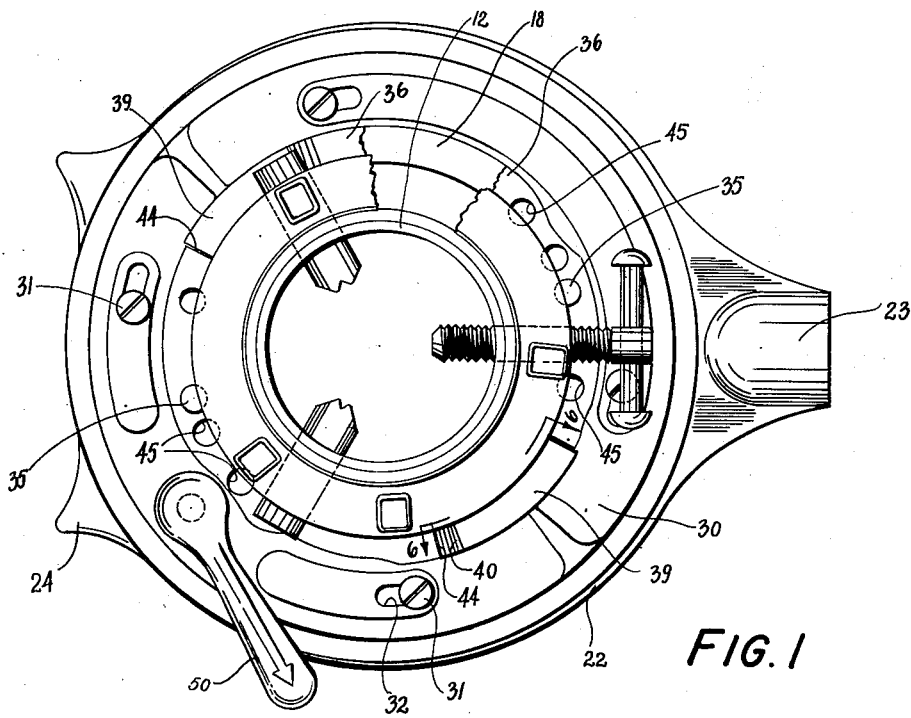
Fig. 1 is a plan view of the threader from the the work holder end.
Figure 2:
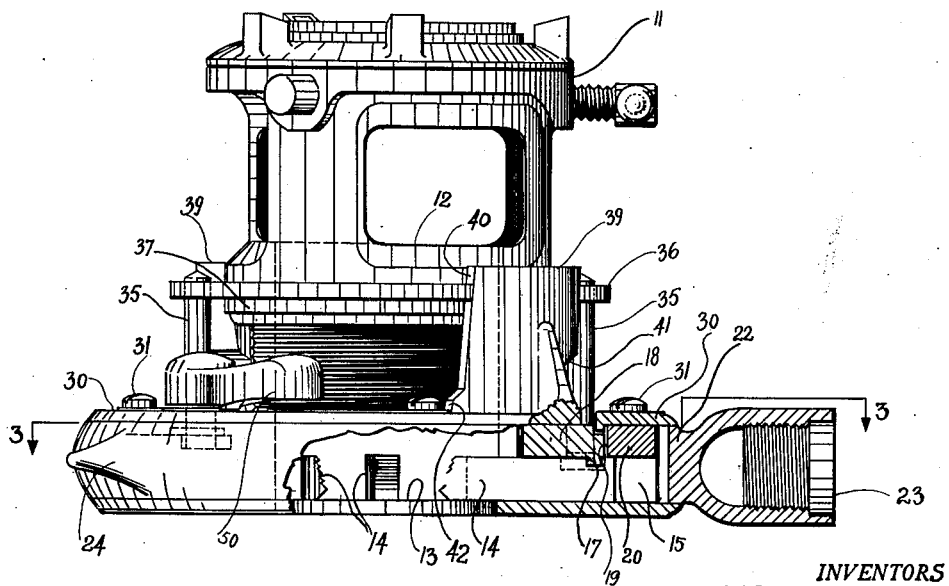
Fig. 2 is an elevational view of the threader embodying one form of my invention, partly in section to show the chasers.
Figure 3:
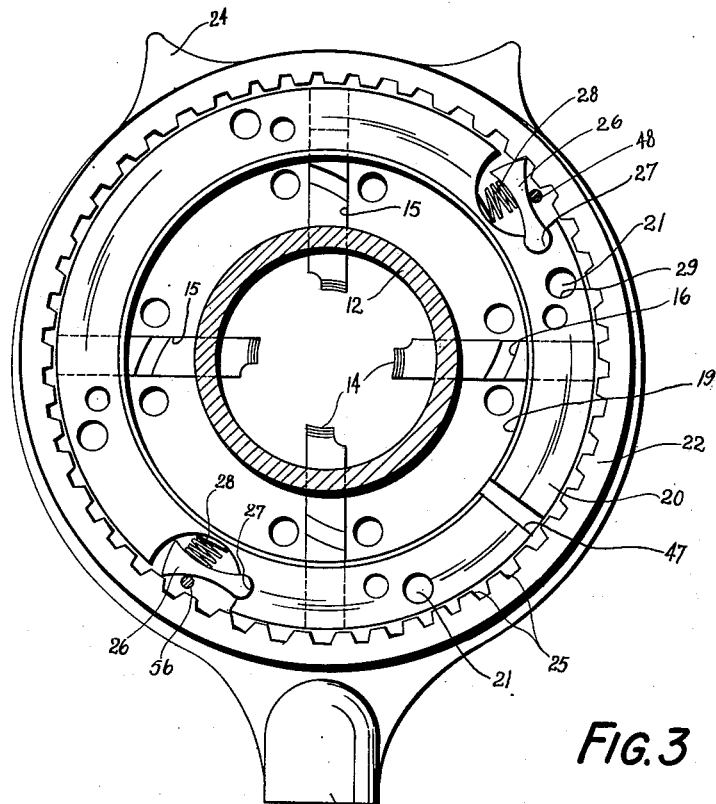
Fig. 3 is a sectional view along line 3—3 of Fig. 2.
Figure 4:
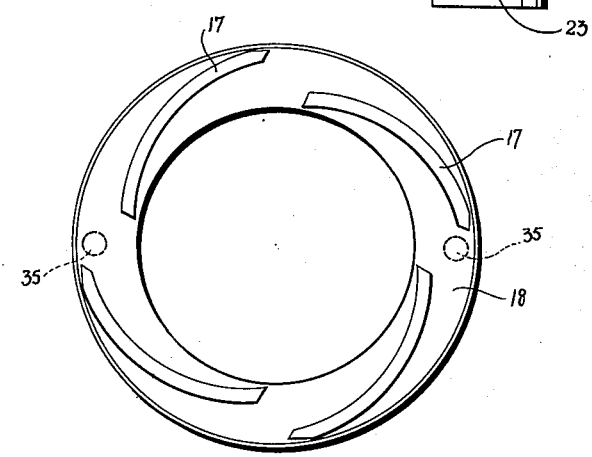
Fig. 4 is a bottom plan view of the cam plate.

Each of the chasers 14 is formed with a groove 16 (Fig. 3) which receives a cam land 17 in the form of a spiral rib on the underside of a cam plate 18. The cam plate 18 surrounds the barrel 12 and is rotatable thereabout so that the chasers 14 are either moved in or out from the center of the device as the cam plate is rotated. Thus, the position of the chasers is determined by the angular position of the cam plate.

A drive ring 22, having an interiorly threaded handle socket 23 and feet 24, surrounds the ring 20 and is adapted to drive the threader through teeth 25 formed on its inner surface. A pair of dogs or pawls 26 bearing in seats 27 formed in the barrel supporting ring 20 is adapted to engage the teeth 25 to transmit the driving force from the ring 22 to the carrier plate 13 and thus to drive the chasers 14. These pawls 26 extend from their seats in opposite directions and are urged outward by springs 28 into engagement with the teeth 25. Thus, if both pawls are engaged with the teeth 25, the tool may be rotated in either direction by the ring 22. This condition is prevented by means, to be described hereinafter, which hold one pawl or the other always out of engagement to permit a ratchet action.

Figure 5:
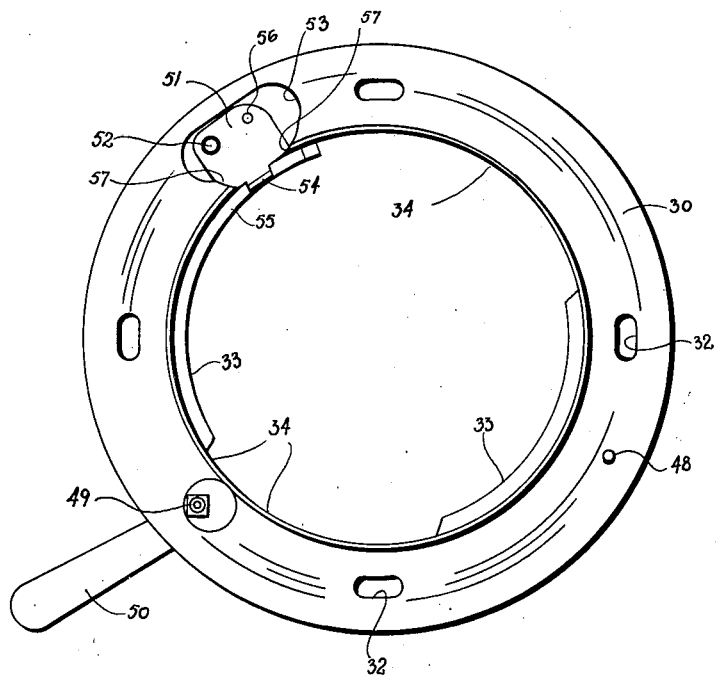
Fig. 5 is a bottom plan view of the drive plate.

A drive plate 30 is held in sliding relationship to the ring 20 by shouldered screws 31 extending through slots 32 in the drive plate. The drive plate 30 extends beyond the edge of the ring 20 and overhangs the drive ring 22 thus providing an annular groove in which the drive ring 22 is retained. The plate 30 at its inner edge 33 also overhangs the cam plate 18 retaining it in position. This latter overhang is cut away at 34 (Fig. 5) to allow for substantial movement of a pair of posts 35 diametrically opposite each other on the cam plate 18. This movement of the cam plate is necessary to adjust the position of the chasers as noted above.

Movement of the cam plate 18 is controlled through the posts 35 by a change plate 36 in the form of a ring rotatably journalled on the work holder housing 11 and held thereon by a snap ring 37. Diametrically opposed guides 39 are formed on the drive plate 30 and are shaped with sloping sides 40. These sides, near the plate, are formed with a notch 41 on one side and a boss 42 on the other for a purpose to be made clear hereinafter. Notches 44 in the change plate 36 embrace these guides and govern the movement of the plate by the shape of the sides 40. A series of holes 45 in the change plate are adapted to slide smoothly over the posts 35. These holes are arranged so that the chasers will be positioned to thread different standard pipe sizes when the cam plate is positioned according to the location of the holes. Thus the device is adjustable for a plurality of sizes of pipe.

In addition to the above adjustment, the change plate or ring 36 is rotated slightly by the sloping sides 40 as the thread cutters travel longitudinally of the pipe and as the threaded barrel 12 is pulled into the work holder 11. This slight rotation causes the chasers 14 to be withdrawn to cut the proper form of tapered thread. The boss 42 and notch 41 near the end of the guides 39 cause the change plate 36 to be moved quickly and far enough to cause the cam plate to withdraw the chasers from the pipe. The work holder 11 can then be released and the machine removed. This above described device and operation are well known in the art.

From the underside of the drive plate 30 a pin or peg 48 extends downward into close juxta-position with the pawl 26 which drives the carrier plate 13 in a direction to unscrew the barrel 12 from the workholder 11. This pin 48 is so placed that when the drive plate 30 is moved to one end of the slots 32, the pin is free from the pawl 26 which is then in driving relation to the teeth 25. When the plate 30 is moved to the other end of the slots, the pin 48 engages the pawl 26 to withdraw it from the teeth. In the original device a similar pin was provided for the opposite pawl. This, however, resulted in the disadvantage of having a continuous driving even to the extent of jamming the threads or breaking parts of the machine when the tool was used with a power drive. The plate 30 is moved between its opposite positions by a crank or eccentric mechanism 49 journalled in the drive plate 30, and engaged in a slot 47. The mechanism 49 may be turned from the outside by a handle 50.

From what has been said hereinbefore, it is clear that there is relative rotatable and axial movement between the means that is driven and the ring member.

The foregoing description is of one device on which my invention may be used and in connection with which certain definite advantages are realized. However, this detailed description is not meant to limit the use of the invention to this particular machine, for it will be obvious from the following description that the invention may be utilized with many ratchet operated devices.

In a preferred embodiment of my invention, a small plate 51 is pivoted on a pin 52 fixed in a relieved portion 53 of the drive plate 30. This relieved portion 53, and the plate 51 are formed with closely matching surfaces at 57 arcuate about the pin 52. These surfaces then can slide relative to each other, but prevent the entry of metal chips which might cause the device to become inoperative. A portion 54 of the plate 51 is bent upward and extends into a relieved portion 55 of the guides 39 near the notch 41. A pin 56 is fixed in the plate 51 in position to engage the pawl 26 to move it from engagement with the teeth 25 when the drive plate 30 is moved to one end of its slots 32 by the mechanism 49 in a manner similar to the prior devices. It is apparent that this pin 56 will similarly disengage the pawl 26 if the plate 51 is pivotally moved about its pivot pin 52. Normally, however, the pin 56 is biased outwardly by the force of the spring 28 which engages the pawl 26.

Figure 6:
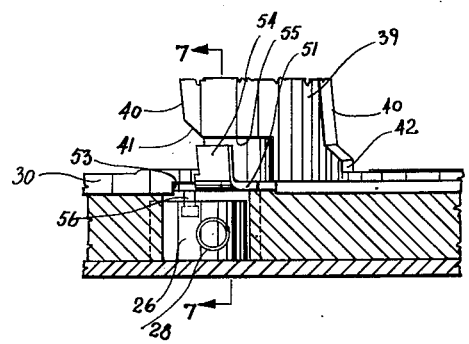
Fig. 6 is a detailed partial sectional view along line 6—6 of Fig. 1.
Figure 7:
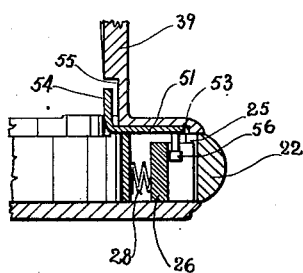
Fig. 7 is a sectional view along line 7—7 of Fig. 6.

As the threader moves toward the workholder 11, being drawn thereto because of the action of the threaded barrel 12, the change plate 36 slides down the guides 39 and eventually is moved quickly in an angular direction because of its engagement with the boss 42. This movement serves to disengage the chasers 14 by motion of the cam plate 18. In addition, the edge of the notch 44 in the change plate is pulled into the notch 41 of the guide. In moving into this notch 41, the edge engages the upstanding part 54 of the plate 51 (Fig. 6) and causes that plate to pivot about the pin 52. This causes the pin 56 to disengage the pawl 26 and thus to free the drive ring 22 entirely from the rest of the device. Thus, if the work were being driven and the drive ring 22 were held stationary, the entire device upon reaching the release point would be free to turn independently of the drive ring and without relative movement between the workholder 11 and the barrel 12 and there would, therefore, be no possible jamming of the threader.

Figure 8:
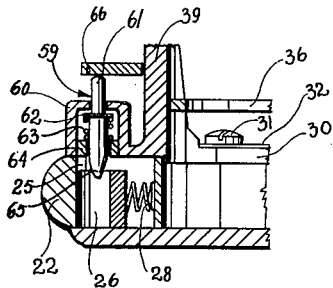
Fig. 8 is a sectional view similar to Fig. 7 of another embodiment of my invention.
Figure 9:
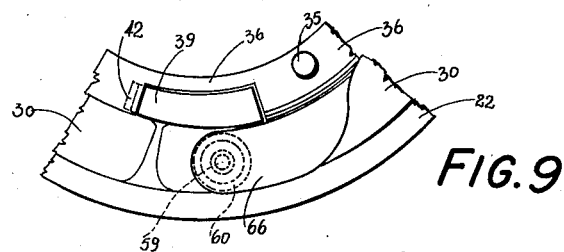
Fig. 9 is a partial top plan view of the embodiment of Fig. 8.

In another embodiment of my invention (Figs. 8 and 9) a sliding cam pin 59 is journalled in a housing 60 formed on the drive plate 30, above the pawl 26 which drives the carrier plate. The pin at its upper end 61 extends above the housing 60. Within the housing, the pin is formed with an enlarged portion 62 which provides a stop to prevent the pin from being withdrawn upward, and also provides a shoulder on which a spring 63 can press. The other end of the spring 63 seats on a plug 64 pressed into the opening at the bottom of the housing. Thus, the pin is biased upward. The lower end of the pin extends through the plug 64 and is tapered in a nominally conical formation. As illustrated in Fig. 8, when the pin is in its uppermost position, enough still protrudes to engage and release the pawl 26 if the drive plate is turned. This action is similar to that of pin 48.

An extended lip 66 is formed on the change plate 36 in position to engage the upper part 61 of the pin 59. As the threader is carried toward the workholder, the pin approaches this lip 66 until, just before the change plate 36 is moved into the notches 41, the lip 66 engages the pin 59 and begins to press downward (Fig. 8). As the pin moves downward, the tapered part 65 engages the pawl 26, and when the change plate enters the notches 41 to release the chasers 14, the pin 59 is effective to move the pawl 26 out of engagement with the teeth 25. This occurs before the barrel 12 is completely threaded into the workholder 11. Since the release of the pawl 26 from the teeth breaks the driving relationship between the driving ring 22 and the rest of the machine, it is obvious that no damage can be done to the machine by a continued rotation of the handle socket 23 relative to the pipe or of the pipe relative to the driving ring.

Several other modifications and embodiments of this invention have been conceived. One of these is illustrated in Figs. 10 and 11. In this embodiment, the change plate 36 is formed with an ear 68 extending outward over the location of the pawl 26 similar to the lip 66. A chamfered hole 69 is formed in the ear for engagement with the larger diameter portion 70 of a shouldered pin. This portion 70 extends through a slot 71 in the drive plate 30 beneath which a slide member 72 is slidably journalled in a groove 73 formed in the drive plate. The smaller diameter portion 75 of the pin is pressed through the slide member 72, being held therein by the tightness of the fit. The extension of the smaller diameter portion 75 below the drive plate acts in the same manner as the pin 48 when the slide is at its position farthest removed from the guides 39. However, as the portion 70 is engaged by the opening 69 in the change plate 36, the slide member 72 carrying the pin is moved, and when the change plate is moved into the notch 41, the smaller diameter portion 75 of the pin is carried against the pawl 26 disengaging it from the teeth 25 similarly to the action of the previous embodiment.

Still another alternative is illustrated in Figs. 12 and 13. In this embodiment, the release device is formed directly on the pawl. The pawl 26a (Fig. 13) is formed substantially the same as in prior described embodiments except for an arm 76 extending from the upper surface. This arm extends into a relieved space 77 in the ring 20 and is formed with a follower 78 at one end. This follower engages cam notches 79 formed in the edge of the cam plate 18. These notches are separated by rising cam surfaces 80 adapted to engage the follower 78 to move the pawl 26a out of engagement with the teeth 25. These surfaces 80 are spaced so that this motion occurs when the cam plate is moved quickly by the change plate 36 as it enters the notch 41. Several surfaces 80 are needed in this embodiment to accommodate for the several sizes of pipe adapted to be threaded by the machine. A pin similar to the pin 48 would then be used to release the pawl to allow a ratcheting action of the device when the direction of rotation was reversed.

Having thus described several embodiments of our invention, we are aware that numerous and extensive departures may be made therefrom without departing from the spirit or scope of our invention.

We claim:

1. A tool comprising a workholder member by which the tool may be fixed to a workpiece, a driven member having screw threads threadably engaged with said workholder, said driven member being adapted to be screwed into said workholder thereby, a driving member, pawl and tooth means normally engaging said driving and said driven members to provide driving engagement therebetween, ring means rotatably journalled on said workholder, the driven means effecting relative rotatable and axial movement between it and the ring means, pawl release means movably mounted on said driven member, means formed on said ring means adapted to engage said pawl release means to release said pawl and interrupt said driving engagement.

2. In combination with a tool having a driving member, and a driven member, and a pawl and tooth driving means establishing a driving relationship between said members; means for interrupting said driving relationship comprising a pawl engaging member movably mounted on said driven member, movable means driven by said driven member and axially and rotatably movable relative thereto during the threading operation, adapted to move said pawl engaging member into engagement with said pawl to force said pawl out of driving engagement with said teeth at a predetermined location of said movable means relative to said driven means.

3. In combination with a tool having a driving member, and a driven member, and pawl and tooth driving means establishing a driving relationship between said members; pawl engaging means movably mounted on said driven member, ring means driven by said driven means but rotatably and axially movable relative thereto, means formed on said ring means adapted to engage said pawl engaging means at a certain position of said ring means relative to said driven member, said pawl engaging means being adapted upon such engagement to interrupt the driving engagement between said pawl and said teeth.

4. In combination with a tool having a workholder member adapted to hold the tool to the workpiece, a driven member, having a threaded portion threadably engaged with said workholder, a driving member, and a pawl and tooth driving means engaged between said driving and driven member to establish a driving relationship therebetween; pawl release means adapted to engage said pawl to interrupt said driving relationship comprising pin means movably disposed on said driven member adapted to engage said pawl to release it, ring means on said workholder being formed with a pin engaging portion, said ring being rotatably and axially movable relative to said driven member, said pin engaging portion being adapted to engage said pin means to move it and interrupt said driving relation at a predetermined position of said driven member with respect to said workholder.

5. The tool as defined in and by claim 1 wherein there is provided pawl release means adapted to engage said pawl to interrupt said driving engagement comprising pin means slidably journalled in said driven member, spring means engaged between said pin means and said housing adapted to urge said pin means to one position, said ring means carried by said workholder adapted to engage said pin to force it against said spring to release said driving relationship at a predetermined position of said driven member and said workholder.

6. The tool as defined in and by claim 1 wherein there is provided pawl release means adapted to engage said pawl to interrupt said driving engagement comprising pin means slidably journalled in said driven member, spring means engaged between said pin means and said housing adapted to urge said pin means to one position, said ring means carried by said workholder adapted to engage said pin to force it against said spring to release said driving relationship at a predetermined position of said driven member and said workholder, said pin being formed with cam surfaces adapted to engage said pawl to move it out of engagement with said teeth.

7. The tool as defined in and by claim 1 wherein there is provided pawl release means comprising pin means slidable circumferentially in said driven member and adapted to engage said pawl means, said ring means disposed on said workholder member formed with pin engaging means, said pin engaging means being adapted to engage said pin to slide it quickly at a predetermined location of said ring means relative to said driven member.

8. The tool of claim 7 in which the pin engaging means is an extension from said ring means having a hole therein through which the pin may extend.

9. The tool as defined in and by claim 1 wherein there is provided pawl release means comprising pin means slidable circumferentially in said driven member and adapted to engage said pawl means, guide means on said driven member engaging said ring means to guide it as said driven member is threaded into said workholder, pin engaging means formed in said ring means adapted to engage said pin means, said guide means being formed to move said ring means with an angular movement thereby moving said pin means to engage and release said pawl.

10. The tool as defined in and by claim 1 wherein there is provided pawl release means comprising pin means movably mounted on said driven member engaged with said pawl means, guide means on said driven member, said ring means rotatably disposed on said workholder member and formed with notches embracing said guide means, said guide means being formed to move said ring means in an angular direction, said pin being disposed in position to be engaged by the edge of one of said notches at a predetermined point to be moved thereby and to engage said pawl means and interrupt said driving relation.

11. The tool of claim 10 in which the pin means comprises a plate pivoted on the driven member having a ring engaging portion and carrying a pin adapted to engage the pawl to release it.

12. In combination with a tool having a workholder member adapted to hold the tool to the workpiece, a driven member having a threaded portion threadably engaged with said workholder, a driving member, and a pawl and tooth driving means engaged between said driving and driven member to establish a driving relationship therebetween; pawl release means adapted to engage said pawl to interrupt said driving relationship comprising a plate pivotally carried by said driven member having a pin disposed for engagement with said pawl to release it and a portion extending above said driven member, ring means on said workholder, said ring being movable relative to said driven member and being guided by a guide means on said driven member and having a portion for engagement with the upward extending part of the pawl release, said pawl release engaging portion being adapted to engage said pawl release means to move it and interrupt said driving relation at a predetermined position of said driven member with respect to said workholder and cam means on said guide means for moving said ring in larger increments at said preliminary position.

13. A drive release for a thread cutting tool having a workholder member adapted to hold the tool on a workpiece, a driven member having a threaded portion threadably engaged with said workholder, a driving member, and a pawl and tooth driving means engaged between said driving and driven member to establish a driving relationship therebetween, a chaser controlling ring rotatably journalled on the work holder and guide posts on the driven member having a cam surface in engagement with and for controlling relative movement of said ring; pawl release means adapted to engage said pawl to interrupt said driving relationship including a plate pivotally journalled in said driven member and carrying a projection arranged to engage said pawl upon pivotal movement of the plate, a lug on said plate extending above said driven member, said ring guidepost means being formed with a recess adjacent the driven member and said lug being disposed in said recess, ring means on said workholder being movable relative to said driven member, said ring guide post means being formed with a cam rise portion on the side opposite to said recess and said ring being engageable with said rise at a predetermined position of said driven member with respect to said workholder to move the ring into said recess and engage said lug.

References Cited in the file of this patent

UNITED STATES PATENTS

| Number | Name | Date |
|---|---|---|
| 1,956,182 | Thewes | Apr. 24, 1934 |
| 2,110,099 | Thewes | Mar. 1, 1938 |
| 2,119,014 | Kimlin et al. | May 31, 1938 |
| 2,333,868 | Kylin | Nov. 9, 1943 |
| 2,512,780 | Spisak | June 27, 1950 |